(12) United States Patent
Miyamoto

(10) Patent No.: US 10,264,228 B2
(45) Date of Patent: Apr. 16, 2019

(54) DECODING APPARATUS, DECODING METHOD, AND NON-TRANSITORY RECORDING MEDIUM

(71) Applicant: CASIO COMPUTER CO., LTD., Tokyo (JP)

(72) Inventor: Naotomo Miyamoto, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 149 days.

(21) Appl. No.: 15/041,791

(22) Filed: Feb. 11, 2016

(65) Prior Publication Data

US 2016/0286227 A1 Sep. 29, 2016

(30) Foreign Application Priority Data

Mar. 23, 2015 (JP) .................................. 2015-058866

(51) Int. Cl.
*G06K 9/00* (2006.01)
*H04N 9/68* (2006.01)
*H04B 10/50* (2013.01)
*H04N 5/232* (2006.01)
*H04N 5/235* (2006.01)
*H04N 9/07* (2006.01)
*H04M 1/725* (2006.01)

(52) U.S. Cl.
CPC .............. *H04N 9/68* (2013.01); *H04B 10/50* (2013.01); *H04N 5/2351* (2013.01); *H04N 5/23212* (2013.01); *H04N 9/07* (2013.01); *H04M 1/7253* (2013.01)

(58) Field of Classification Search
CPC .. H04N 9/646; G06T 2207/10024; G06T 7/11
See application file for complete search history.

(56) References Cited

U.S. PATENT DOCUMENTS

2002/0110376 A1* 8/2002 MacLean ............... G03B 17/48
396/429
2003/0184671 A1* 10/2003 Robins ................... H04N 5/235
348/362

(Continued)

FOREIGN PATENT DOCUMENTS

JP 2015-15693 A 1/2015

OTHER PUBLICATIONS

Office Action dated May 30, 2017, issue in corresponding Japanese Patent Application No. 2015-058866 and English translation of the same. (8 pages).

*Primary Examiner* — Li Liu
(74) *Attorney, Agent, or Firm* — Fitch, Even, Tabin & Flannery LLP

(57) ABSTRACT

In the case where a phenomenon called brightness saturation occurs due to high brightness of light output from a transmission apparatus and high lightness in a portion of a transmitter (light source) within a frame obtained by imaging in a reception apparatus, a decoder in a reception apparatus performs first image processing of shifting the focus by moving a lens in an imager or a filtering process (gradation filtering process) of an image for replacing the color of a brightness saturation area with the color surrounding the brightness saturation area, before determination of a change area, determination of the color of the change area, and decoding of bit string data.

12 Claims, 6 Drawing Sheets

(56) References Cited

U.S. PATENT DOCUMENTS

| | | | |
|---|---|---|---|
| 2004/0143380 A1* | 7/2004 | Stam | B60Q 1/085 |
| | | | 701/36 |
| 2005/0057485 A1* | 3/2005 | Diefenbaugh | G09G 3/3406 |
| | | | 345/102 |
| 2007/0035641 A1* | 2/2007 | Yamada | H04N 9/045 |
| | | | 348/241 |
| 2011/0305388 A1* | 12/2011 | Wedi | G06T 5/005 |
| | | | 382/165 |
| 2012/0288192 A1* | 11/2012 | Heidrich | G06T 5/005 |
| | | | 382/167 |
| 2014/0055342 A1* | 2/2014 | Kamimura | G06F 3/013 |
| | | | 345/156 |
| 2014/0333823 A1* | 11/2014 | Sakaguchi | H04N 5/23212 |
| | | | 348/353 |
| 2016/0352975 A1* | 12/2016 | Kervec | H04N 1/6027 |

\* cited by examiner

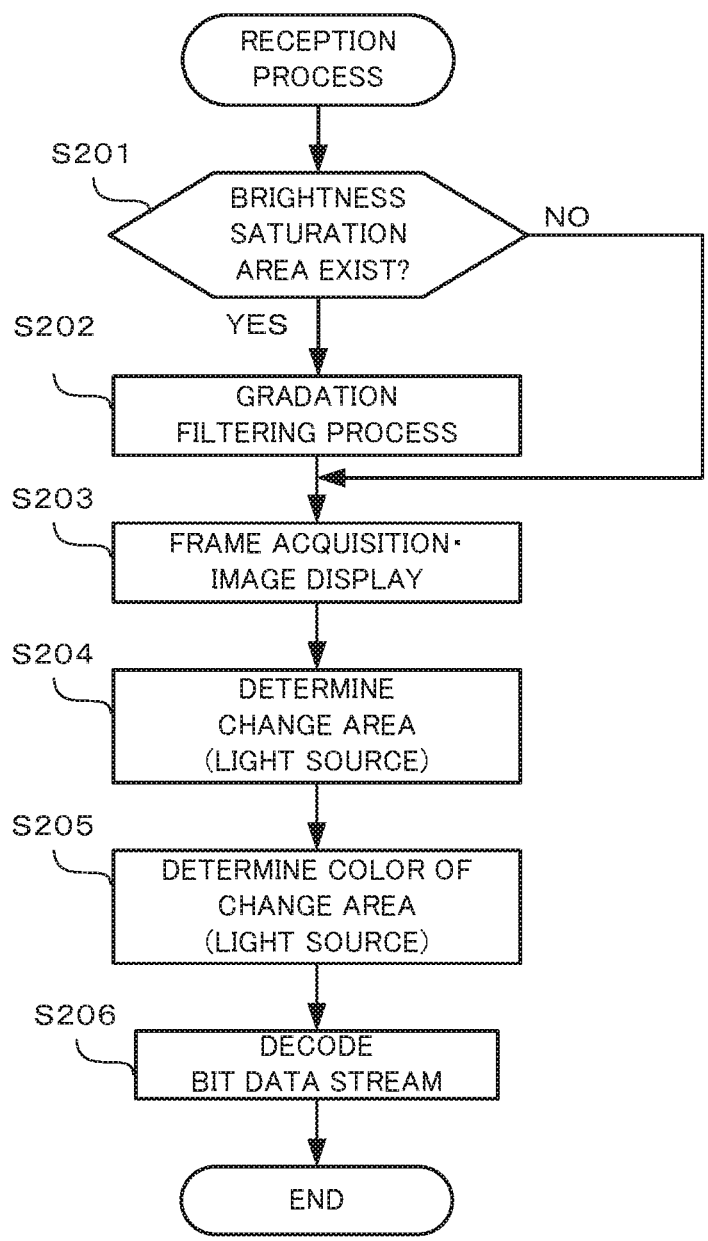

DECODING APPARATUS, DECODING METHOD, AND NON-TRANSITORY RECORDING MEDIUM

CROSS-REFERENCE TO RELATED APPLICATION

This application claims the benefit of Japanese Patent Application No. 2015-58866, filed on Mar. 23, 2015, the entire disclosure of which is incorporated by reference herein.

FIELD

The present disclosure relates to a decoding apparatus, a decoding method, and a non-transitory recording medium.

BACKGROUND

As disclosed in Unexamined Japanese Patent Application Kokai Publication No. 2015-15693, conventionally, a technology of utilizing the camera device on a mobile phone to scan a change in brightness of optical signals transmitted by a visible light communication, and decoding such optical signals to information has been known.

SUMMARY

A decoding apparatus according to the present disclosure includes:
an image acquiring unit configured to continuously acquire an image including a color changing in time-series;
a processing unit configured to perform processing for a pixel area of brightness saturation in an image acquired continuously by the image acquiring unit to increase an image area including the color; and
a decoding unit configured to decode information from a color of an image of which an area has been increased by the processing unit.

A decoding method according to the present disclosure includes:
an image acquiring step of continuously acquiring an image including a color changing in time-series;
a processing step of performing processing for a pixel area of brightness saturation in an image acquired continuously in the image acquiring step to increase an image area including the color; and
a decoding step of decoding information from a color of an image of which an area has been increased in the processing step.

A non-transitory recording medium according to the present disclosure is a computer-readable non-transitory recording medium recording a program to cause a computer to function as:
an image acquiring unit configured to continuously acquire an image including a color changing in time-series;
a processing unit configured to perform processing for a pixel area of brightness saturation in an image acquired continuously by the image acquiring unit to increase an image area including the color; and
a decoding unit configured to decode information from a color of an image of which an area has been increased by the processing unit.

BRIEF DESCRIPTION OF THE DRAWINGS

A more complete understanding of this application can be obtained when the following detailed description is considered in conjunction with the following drawings, in which:

FIG. 6 is a flowchart showing the operation of a reception process including second image processing in the reception apparatus.

DETAILED DESCRIPTION

Figure 1:
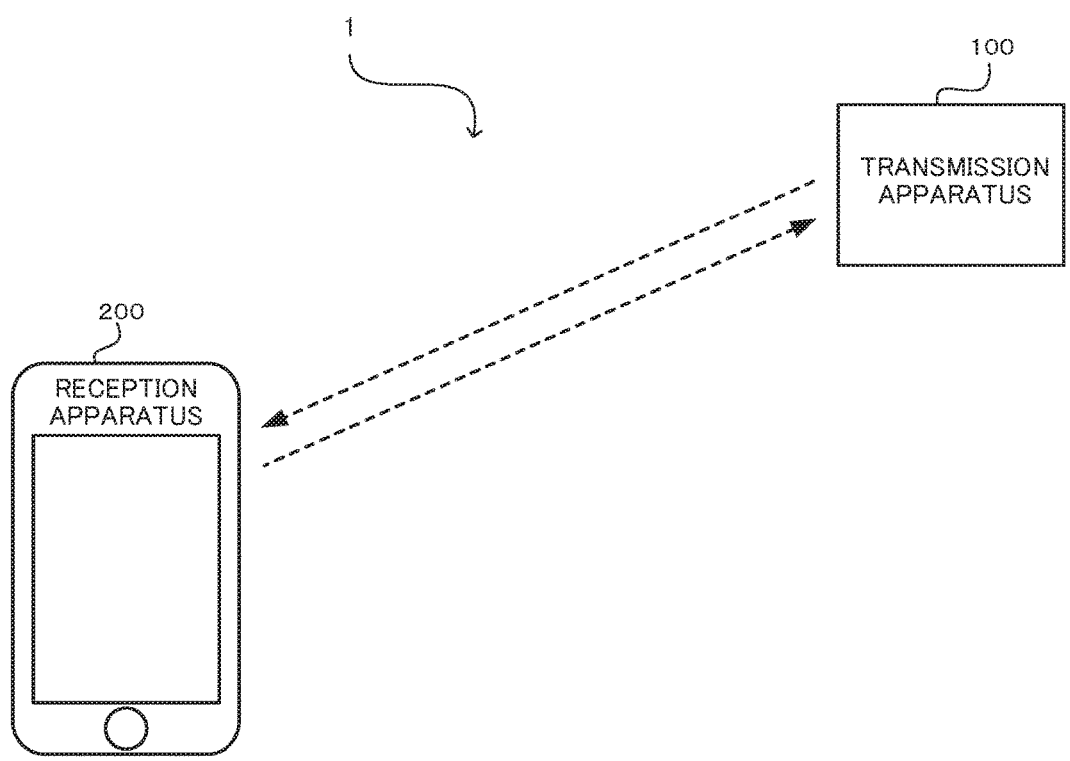
FIG. 1 is a diagram showing the configuration of an optical communication system according to an embodiment of the present disclosure.

An optical communication system according to an embodiment of the present disclosure will be described below. As shown in FIG. 1, an optical communication system 1 according to the embodiment of the present disclosure includes a transmission apparatus 100 and a reception apparatus 200.

In the optical communication system 1, the transmission apparatus 100 and the reception apparatus 200 can perform communication from the transmission apparatus 100 to the reception apparatus 200 with light as a communication medium.

With the transmission apparatus 100, information to be communicated to the reception apparatus 200 is converted by modulation into and output as an optical signal changing in time-series of red (R), green (G), and blue (B) that are visible light.

The reception apparatus 200 is, for example, a smart phone and receives an optical signal from the transmission apparatus 100 by imaging the transmission apparatus 100 included in an imaging range. The reception apparatus 200 displays an image obtained by imaging. With the reception apparatus 200, information to be communicated is decoded from a received optical signal and displayed.

Figure 2:
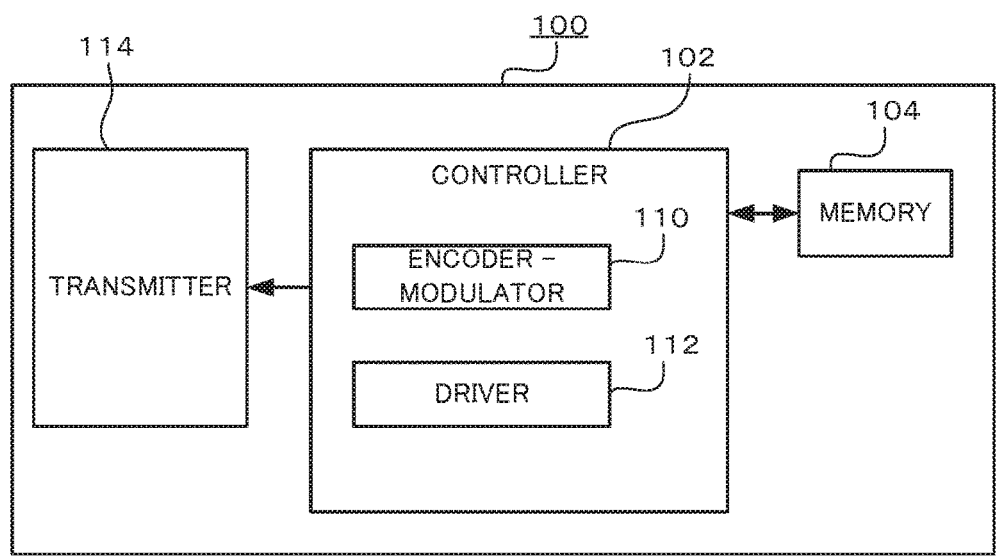
FIG. 2 is a diagram showing the configuration of a transmission apparatus shown in FIG. 1.

Next, the transmission apparatus 100 will be described. As shown in FIG. 2, the transmission apparatus 100 includes a controller 102, a memory 104, and a transmitter 114. The controller 102 includes a central processing unit (CPU), executes software processing according to a program stored in the memory 104, and functions to realize various functions provided to the transmission apparatus 100.

The memory 104 is, for example, a random-access memory (RAM) for a work area or a read-only memory (ROM) storing a basic operation program. The memory 104 stores various information (such as a program) used for control and/or the like in the transmission apparatus 100.

An encoder-modulator 110 within the controller 102 encodes information to be communicated into a bit data stream. Further, the encoder-modulator 110 performs digital modulation based on the bit data stream. For the modulation scheme, 4 pulse-position modulation (PPM) using a carrier wave at a frequency of 28.8 kHz is employed, for example. Based on a signal generated by the encoder-modulator 110, a driver 112 within the controller 102 performs control with respect to the transmitter 114 such that light is changed temporally with a change cycle t1 at the same brightness, among red (R), green (G), and blue (B) that are visible light with differing wavelengths.

The transmitter 114 is, for example, a light-emitting diode (LED). Through control by the driver 112, light of respective wavelengths for red (R), green (G), and blue (B) is output at the same brightness while being changed temporally with the change cycle t1.

Figure 3:
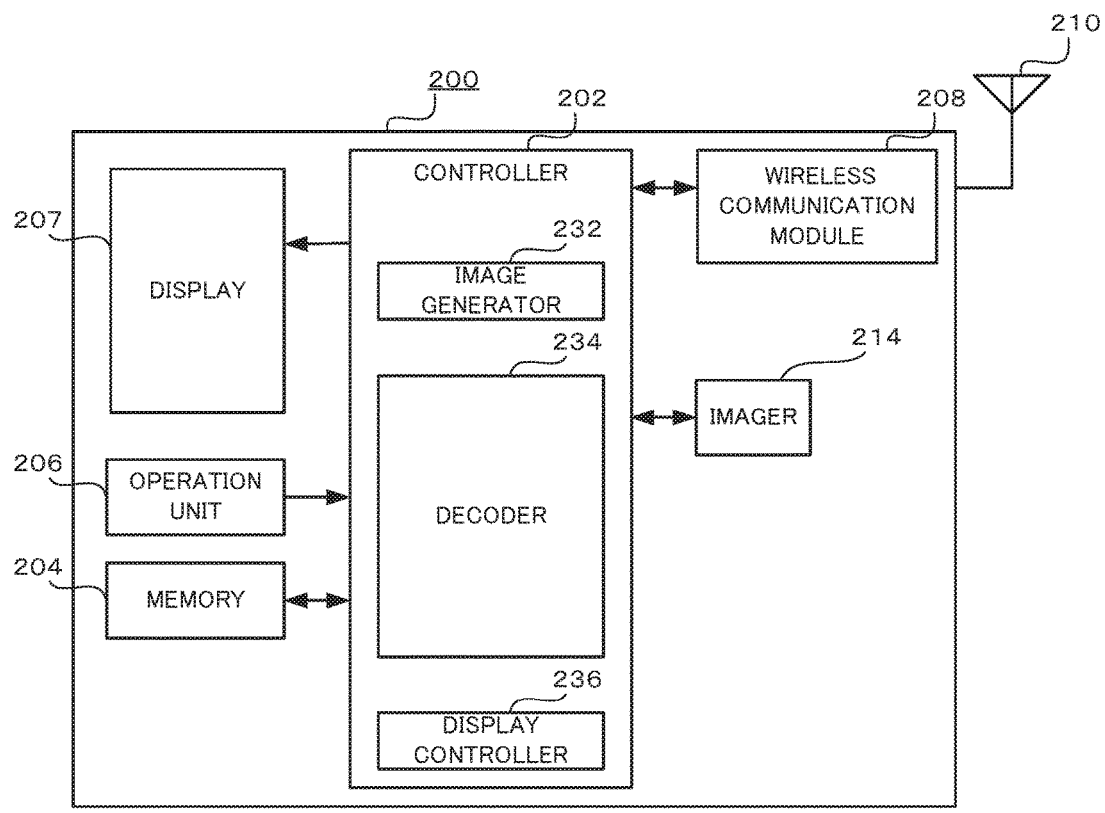
FIG. 3 is a diagram showing the configuration of a reception apparatus shown in FIG. 1.

Next, the reception apparatus 200 will be described. The reception apparatus 200 displays a taken image and also functions as a communication apparatus for receiving information from the transmission apparatus 100. As shown in FIG. 3, the reception apparatus 200 includes a controller 202, a memory 204, an operation unit 206, a display 207, a wireless communication module 208, an antenna 210, and an imager 214.

The controller 202 is configured of a CPU. The controller 202 functions to realize various functions provided to the reception apparatus 200, by executing software processing according to a program stored in the memory 204.

The memory 204 is, for example a RAM or a ROM. The memory 204 stores various information (such as a program) used for control and/or the like in the reception apparatus 200.

The operation unit 206 is a touchscreen arranged on the upper surface of a display area of the display 207 and is an interface used for inputting operation content of a user. The display 207 is configured of, for example, a liquid crystal display (LCD), a plasma display panel (PDP), an electroluminescence (EL) display, or the like and displays an image.

The wireless communication module 208 is configured using, for example, a radio frequency (RF) circuit, a base band (BB) circuit, and/or the like. The wireless communication module 208 transmits and receives a radio signal via the antenna 210. The wireless communication module 208 modulates a transmit signal and demodulates a receive signal.

The imager 214 is disposed on an opposite surface to a surface on which the display 207 is installed in a casing of the reception apparatus 200. The imager 214 includes a lens and photosensitive elements. The lens includes, for example, a zoom lens, and is actuated by the zoom control and focusing control by the controller 202. The field angle of the imager 214, and an optical image are controlled by the actuation of the lens. The photosensitive elements include a plurality of photosensitive elements arranged regularly and two-dimensionally on a photosensitive surface. The photosensitive elements are imaging devices, such as a photo diode, a Charge Coupled Device (CCD) built with color filters in a manner of Bayer arrangement or a three CCD type, or a Complementary Metal Oxide Semiconductor (CMOS).

The imager 214 performs imaging with an imaging cycle t1 identical to the change cycle t1 for light in the transmitter 114 within the transmission apparatus 100. The imager 214 takes an optical image of (receives) entered light at an angle of view of a predetermined range based on a control signal from the controller 202 and successively outputs an image signal within the angle of view to the controller 202.

Every time an image signal from the imager 214 is input, an image generator 232 within the controller 202 converts the image signal to digital data to generate a frame. A display controller 236 within the controller 202 performs control of causing the display 207 to display an image corresponding to a frame.

A decoder 234 within the controller 202 determines a part (change area) where there is a hue change due to a change in wavelength in frames that are input continuously in time-series. Specifically, the decoder 234 determines the lightness of each pixel within image data of a frame. Further, the decoder 234 assumes a pixel of which the lightness value is more than or equal to a predetermined value as a candidate (candidate area) for a part (change area) where there is a hue change due to reception of light of a wavelength corresponding to an emission color from the transmitter 114 within the transmission apparatus 100. Further, the decoder 234 determines the hue in the same coordinates within a candidate area in each of a predetermined number of frames most recently acquired. In the case where, as a result of determination, there is a great change following a predetermined pattern, such as in the case where the hue value in coordinates within a candidate area is a first predetermined value in one frame and is a second predetermined value in another frame, the decoder 234 assumes the candidate area as a change area.

In the case where a change area exists, the decoder 234 then acquires the hue value (type of wavelength) of the change area within a frame upon every imaging and determines the color of the change area corresponding to the hue value as one of red (R), green (G), and blue (B). Further, the decoder 234 decodes a bit data stream corresponding to each color of red (R), green (G), and blue (B) to acquire information to be communicated. Further, the display controller 236 performs control of causing the display 207 to display an image of the information to be communicated.

In the case where the brightness of light output from the transmission apparatus 100 is high and the lightness in a portion of the transmitter 114 (light source) within a frame obtained by imaging in the reception apparatus 200 is high, a phenomenon referred to as brightness saturation occurs, and there is a possibility that a light source portion becomes white. In such cases, the color cannot be determined accurately, and decoding becomes difficult.

Figure 4:
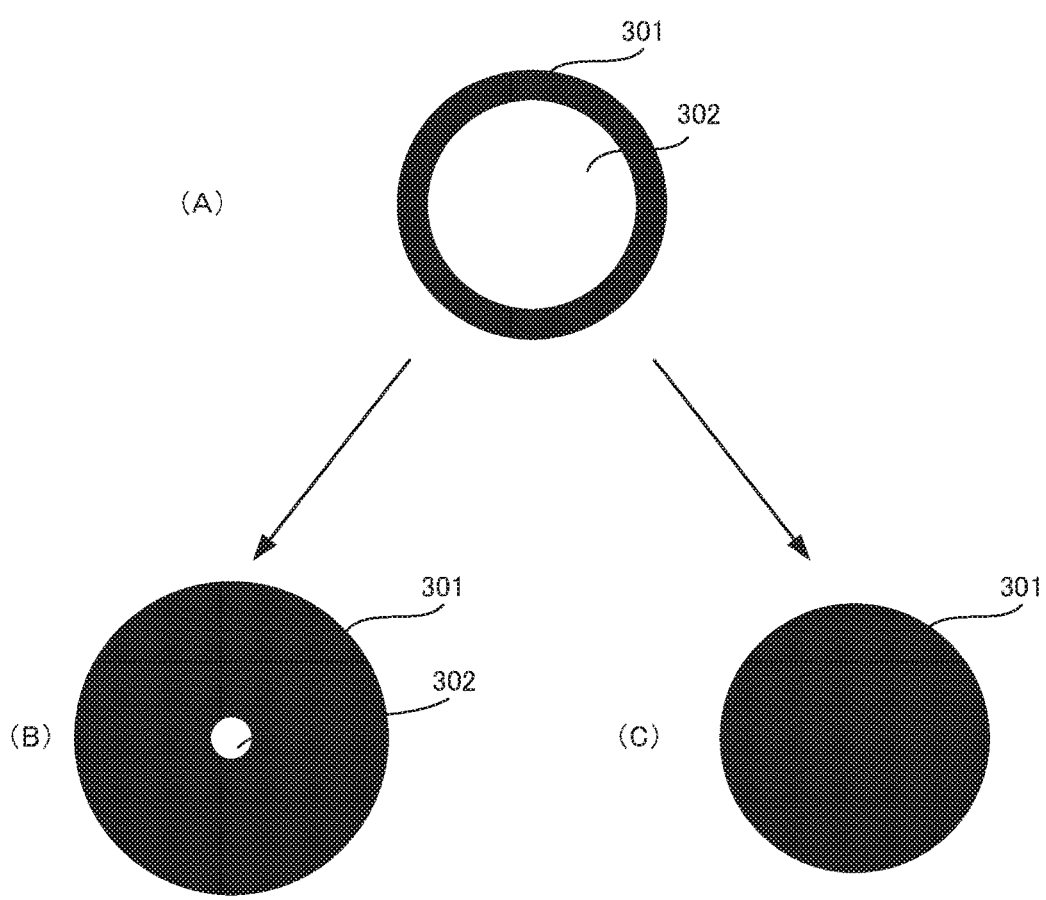
FIG. 4 is a diagram showing image processing in the reception apparatus.

Therefore, in this embodiment, the presence or absence of a brightness saturation area is determined, before determination of a change area, determination of the color of the change area, and decoding of a bit string data in the decoder 234 described above. In the case where a brightness saturation area exists, image processing is performed to enable decoding. FIG. 4 is a diagram showing the image processing. When brightness saturation occurs, as shown in section (A), a light source portion within a frame includes a brightness saturation area 302 on the inside of an area (color area) 301 in the original color of the light source, and the area of the color area decreases from the original area.

Therefore, in this embodiment, first image processing and second image processing are executed selectively. In the first image processing, the decoder 234 performs processing of shifting the focus by moving the lens within the imager 214 and/or the like. Accordingly, a frame becomes a gradated image. As shown in section (B), the area of the color area 301 increases, and the area of the brightness saturation area 302 decreases.

In the second image processing, the decoder 234 executes a program to perform a filtering process (gradation filtering process) of an image. In the filtering process, processing of replacing the color of the brightness saturation area 302 with the color of the color area 301 surrounding the brightness saturation area 302 is performed. Accordingly, as shown in section (C), there is only the color area 301.

Next, the operation of the optical communication system 1 will be described. In the optical communication system 1, a transmission process by the transmission apparatus 100 and a reception process by the reception apparatus 200 are performed.

The encoder-modulator 110 within the controller 102 of the transmission apparatus 100 encodes information to be communicated into a bit data stream and further performs digital modulation based on the bit data stream.

Next, based on a signal generated by the encoder-modulator 110, the driver 112 within the controller 102 performs control with respect to the transmitter 114 such that light is changed temporally with an emission cycle t1, among red (R), green (G), and blue (B). Accordingly, under the control of the driver 112, the transmitter 114 outputs light of red (R), green (G), and blue (B) at the same brightness with the emission cycle t1, based on modulated information to be communicated.

Figure 5:
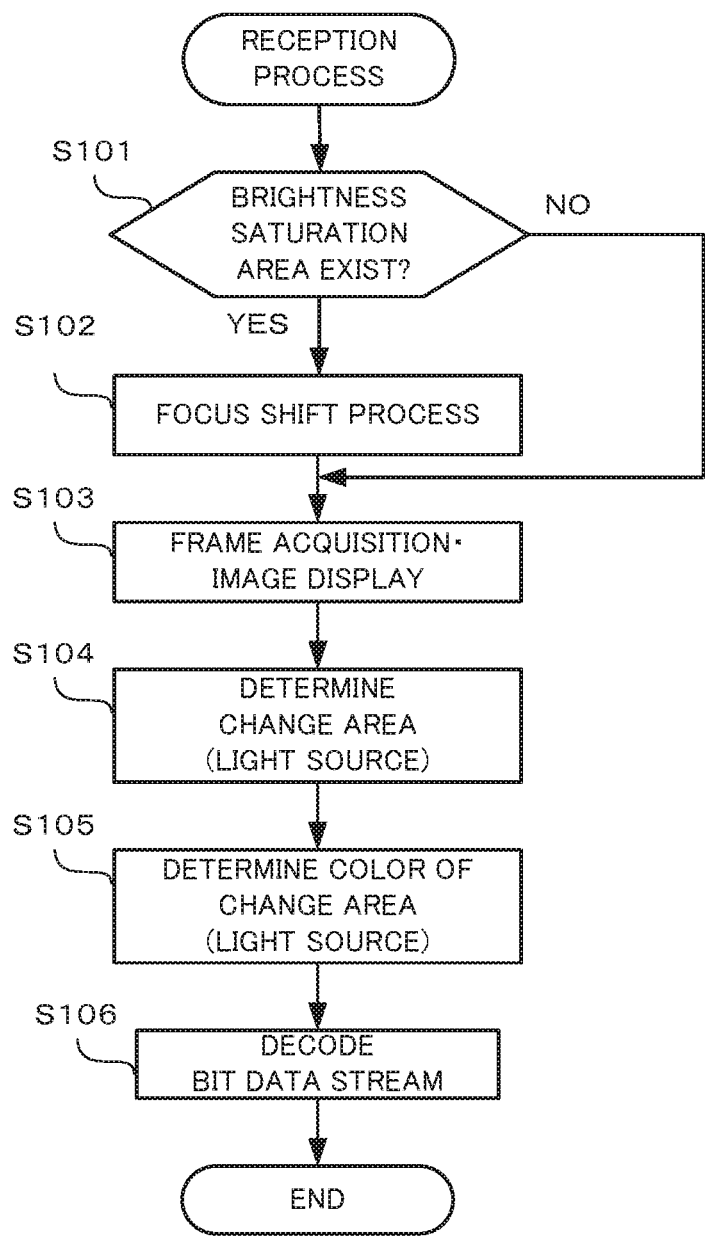
FIG. 5 is a flowchart showing the operation of a reception process including first image processing in the reception apparatus.

FIG. 5 is a flowchart showing the operation of a reception process including the first image processing by the reception apparatus 200. Every time an image signal from the imager 214 is input, the image generator 232 within the controller 202 converts the image signal to digital data to generate a frame. The decoder 234 within the controller 202 determines whether there is a brightness saturation area 302 within the generated frame (step S101).

Specifically, the decoder 234 determines the lightness and hue of each pixel forming the frame. Further, the decoder 234 determines whether a pixel (brightness saturation pixel) having a hue value of white with a lightness value more than or equal to a predetermined value exists, and a pixel (color pixel) having a hue value of one of red (R), green (G), and blue (B) exists surrounding the brightness saturation pixel. The decoder 234 determines that the brightness saturation area 302 exists in the case where a combination of a brightness saturation pixel and a color pixel surrounding thereof exists, and determines that the brightness saturation area 302 does not exist in the case where a combination of a brightness saturation pixel and a color pixel surrounding thereof does not exist.

In the case where the brightness saturation area 302 exists (S101: YES), the decoder 234 performs focus shift process (step S102) by moving the lens within the imager 214 and/or the like. Accordingly, as described above, the frame becomes a gradated image. The area of the color area 301 increases, and the area of the brightness saturation area 302 decreases.

After a focus shift process in step S102, or in the case where the brightness saturation area 302 is determined to not exist in step S101 (S101: NO), the image generator 232 converts the image signal to digital data in real time to generate (acquire) a frame every time an image signal from the imager 214 is input, and the display controller 236 performs control of causing the display 207 to display an image corresponding to the frame (step S103).

Next, the decoder 234 determines a part (change area: light source) where there is a hue change due to a change in wavelength in frames that are input continuously in time-series (step S104). Next, the decoder 234 acquires the hue value (type of wavelength) of the change area within the frame and determines the color of the change area corresponding to the hue value as one of red (R), green (G), and blue (B) (step S105). Further, the decoder 234 decodes a bit data stream corresponding to each color of red (R), green (G), and blue (B) to acquire information to be communicated (step S106). Then, by the display controller 236, control of causing the display 207 to display an image of the information to be communicated is performed.

FIG. 6 is a flowchart showing the operation of a reception process including the second image processing by the reception apparatus 200. In a similar manner to FIG. 5, every time an image signal from the imager 214 is input, the image generator 232 within the controller 202 converts the image signal to digital data to generate a frame. The decoder 234 within the controller 202 determines whether there is the brightness saturation area 302 within the generated frame (step S201).

In the case where the brightness saturation area 302 exists (S201: YES), the decoder 234 executes a program to perform a filtering process (gradation filtering process) of an image (step S202). In the filtering process, as described above, processing of replacing the color of the brightness saturation area 302 with the color of the color area 301 surrounding the brightness saturation area 302 is performed.

After the gradation filtering process in step S202, or in the case where the brightness saturation area 302 is determined to not exist in step S201 (step S201: NO), processing of steps S203 to S206 is performed. The processing of steps S203 to S206 is similar to processing of steps S103 to S106 in FIG. 5, and therefore description is omitted.

In the optical communication system 1 according to this embodiment, as described above, the decoder 234 within the reception apparatus 200 performs first image processing of shifting the focus by moving the lens within the imager 214 and/or the like and processing of replacing the color of the brightness saturation area 302 with the color of the color area 301 surrounding the brightness saturation area 302 through execution of a program to perform a filtering process (gradation filtering process) of an image, before determination of a change area, determination of the color of the change area, and decoding of bit string data, in the case where a phenomenon called brightness saturation occurs due to high brightness of light output from the transmission apparatus 100 and high lightness in a portion of the transmitter 114 (light source) within a frame obtained by imaging in the reception apparatus 200.

The first image processing and the second image processing decreases the area of the brightness saturation area 302 within the frame and increases the color area of red (R), green (G), or blue (B) that is the color of the light source. Therefore, the precision of determination of a change area, determination of the color of the change area, and decoding of bit string data can be improved.

The present disclosure is not limited to the above embodiment, and various modifications and applications are possible. For example, in the embodiment described above, a case where light of red (R), green (G), and blue (B) that are visible light is used for communication has been described. However, visible light of other colors may be used. Further, light other than visible light, such as infrared light, may be used.

The transmitter 114 within the transmission apparatus 100 may be, for example, configured as a part of a display.

The reception apparatus 200 may be any apparatus, as long as imaging is possible. For example, a personal handy-phone system (PHS), a personal digital assistant or personal data assistance (PDA), a tablet personal computer (PC), a game console, a portable audio player, and the like are acceptable.

An apparatus including both of the function of the reception apparatus 200 and the function of the transmission apparatus 100 may be prepared, so that the two functions can be used separately according to the situation.

In the above embodiment, it may be such that a program to be executed is stored for distribution in a non-transitory computer-readable recording medium, such as a flexible disk, a compact disc read-only memory (CD-ROM), a digital versatile disc (DVD), or a magneto-optical disc (MO), and a system that executes the processing described above is configured by installing the program.

A program may be stored in a disk apparatus or the like included in a predetermined server on a network NW, such as the Internet, and superimposed on, for example, a carrier wave for download or the like.

In cases such as where an operating system (OS) shares the load of realizing or where an OS and an application are to coordinate in realizing the function described above, only a portion other than for the OS may be stored for distribution in a non-transitory medium or may be downloaded or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A decoding apparatus comprising:
   a processor,
   wherein the processor performs operations including:
   continuously acquiring a plurality of images each including an image of a light source that emits light and changes a color thereof time-series with the emitted light being based on a first signal that is generated by encoding information to be communicated;
   performing processing to identify a brightness saturation area having a color adjacent a color area having a different color, and to replace the color of the brightness saturation area with the different color of the color area, the color area and the brightness saturation area being adjacent ones of a plurality of pixel areas included in at least one of the plurality of images; and
   acquiring a second signal by converting colors of the plurality of images including the replaced color, and acquiring the information to be communicated by decoding the acquired signal.

2. The decoding apparatus according to claim 1,
   wherein the processor determines for each image whether the image includes (i) the brightness saturation area which is a pixel area having a lightness value more than or equal to a predetermined value and (ii) the color area which is a pixel area adjacent to the brightness saturation area and having a color changing in time-series at a lightness value less than the predetermined value,
   wherein, in a case where determination is positive, the processor performs processing to replace a color of the brightness saturation area with the color of the color area.

3. The decoding apparatus according to claim 1, wherein the processor optically adjusts each image.

4. The decoding apparatus according to claim 1, wherein the processor performs a filtering process on each image.

5. A decoding method comprising:
   an image acquiring step of continuously acquiring a plurality of images each including an image of a light source that emits light and that changes a color thereof in time-series with the emitted light being based on a first signal that is generated by encoding information to be communicated;
   a processing step of performing processing to identify a brightness saturation area having a color adjacent a color area having a different color, and to replace the color of the brightness saturation area with the different color of the color area, the color area and the brightness saturation area comprising adjacent ones of a plurality of pixel areas included in at least one of the plurality of image; and
   an acquiring step of acquiring a second signal by converting colors of the plurality of images including the replaced color, and acquiring the information to be communicated by decoding the acquired second signal.

6. The decoding method according to claim 5, further comprising:
   a determining step of determining for each image whether the image includes (i) the brightness saturation area which is a pixel area having a lightness value more than or equal to a predetermined value and (ii) the color area which is a pixel area adjacent to the brightness saturation area and having a color changing in time-series at a lightness value less than the predetermined value,
   wherein, in a case where the determination in the determining step is positive, processing is performed to replace a color of the brightness saturation area with the color of the color area.

7. The decoding method according to claim 5, further comprising:
   an adjusting step of optically adjusting each image.

8. The decoding method according to claim 5, further comprising:
   a filtering step of performing a filtering process on each image.

9. A non-transitory computer readable recording medium having stored therein a program that causes a computer to function as:
   an image acquiring unit configured to continuously acquire a plurality of images each including an image of a light source that emits light and changes a color thereof in time-series with the emitted light being based on a first signal that is generated by encoding information to be communicated;
   a processing unit configured to perform processing identify a brightness saturation area having a color adjacent a color area having a different color and replace the color of the brightness saturation area with the different color of the color area, the color area and the brightness saturation area being adjacent ones of a plurality of pixel areas included in at least one of the plurality of images; and
   a signal and information acquiring unit configured to acquire a second signal by converting colors of the plurality of images including the replaced color, and acquire the information to be communicated by decoding the acquired signal.

10. The non-transitory recording medium according to claim 9,
    wherein the computer further functions to determine for each image whether the image includes (i) the brightness saturation area which is a pixel area having a lightness value more than or equal to a predetermined value and (ii) the color area which is a pixel area adjacent to the brightness saturation area and having a color changing in time-series at a lightness value less than the predetermined value, and
    wherein, in a case where determination is positive, the computer functions to perform processing to replace a color of the brightness saturation area with the color of the color area.

11. The non-transitory recording medium according to claim 9, wherein the computer further functions to optically adjust each image.

12. The non-transitory recording medium according to claim 9,
wherein the computer further functions to perform a filtering process on each image.

\* \* \* \* \*

UNITED STATES PATENT AND TRADEMARK OFFICE
CERTIFICATE OF CORRECTION

PATENT NO. : 10,264,228 B2
APPLICATION NO. : 15/041791
DATED : April 16, 2019
INVENTOR(S) : Naotomo Miyamoto Page 1 of 1

It is certified that error appears in the above-identified patent and that said Letters Patent is hereby corrected as shown below:

In the Claims

Claim 1, Column 7, Line 28, after "thereof" insert -- in --.
Claim 5, Column 8, Line 5, delete "image" and insert -- images; --, therefor.
Claim 9, Column 8, Line 39, after "processing" insert -- to --.

Signed and Sealed this
Twenty-fourth Day of September, 2019

Andrei Iancu
*Director of the United States Patent and Trademark Office*